(12) United States Patent
Beretich, Jr. et al.

(10) Patent No.: US 7,644,360 B2
(45) Date of Patent: Jan. 5, 2010

(54) PATENT CLAIMS ANALYSIS SYSTEM AND METHOD

(75) Inventors: Guy R. Beretich, Jr., Raleigh, NC (US); JiNan Glasgow, Raleigh, NC (US)

(73) Assignee: Spore, Inc., Raleigh, NC (US)

( * ) Notice: Subject to any disclaimer, the term of this patent is extended or adjusted under 35 U.S.C. 154(b) by 562 days.

(21) Appl. No.: 10/983,458

(22) Filed: Nov. 8, 2004

(65) Prior Publication Data

US 2005/0108652 A1 May 19, 2005

Related U.S. Application Data

(60) Provisional application No. 60/518,119, filed on Nov. 7, 2003.

(51) Int. Cl.
G06F 17/27 (2006.01)
G06F 17/21 (2006.01)

(52) U.S. Cl. ............... 715/270; 715/200; 715/209; 715/277; 715/712; 715/713; 715/775

(58) Field of Classification Search ............ 715/500, 715/514, 515, 712, 713, 775, 200, 209, 270, 715/277
See application file for complete search history.

(56) References Cited

U.S. PATENT DOCUMENTS

| 5,774,833 | A  | * | 6/1998  | Newman ............... 704/9 |
| 6,049,811 | A  | * | 4/2000  | Petruzzi et al. ......... 715/507 |
| 6,298,327 | B1 | * | 10/2001 | Hunter et al. ............ 705/1 |
| 6,339,767 | B1 | * | 1/2002  | Rivette et al. ........... 707/2 |
| 6,499,026 | B1 | * | 12/2002 | Rivette et al. ........... 707/2 |
| 6,738,761 | B1 |   | 5/2004  | Oura |
| 2001/0049707 | A1 | * | 12/2001 | Tran ...................... 707/530 |
| 2002/0022974 | A1 |   | 2/2002  | Lindh |
| 2002/0107896 | A1 | * | 8/2002  | Ronai ..................... 707/530 |
| 2002/0184254 | A1 | * | 12/2002 | Williams et al. ......... 707/500 |
| 2002/0188608 | A1 |   | 12/2002 | Nelson et al. |
| 2003/0061243 | A1 |   | 3/2003  | Kim et al. |
| 2003/0065637 | A1 |   | 4/2003  | Glasgow |
| 2004/0015481 | A1 |   | 1/2004  | Zinda |
| 2004/0078192 | A1 |   | 4/2004  | Poltorak |
| 2005/0234685 | A1 | * | 10/2005 | Tanigawa ................. 703/2 |

OTHER PUBLICATIONS

"Patent Attorney and Spore CEO, JiNan Glasgow, to Speak at United Nations Economic Commision for Europe," Sep. 15, 2003, Business Wire, <http://findarticles.com/p/articles/mi_m0EIN/is_2003_Sept_15/ai_107753478>.*

* cited by examiner

*Primary Examiner*—Joshua D Campbell
(74) *Attorney, Agent, or Firm*—Triangle Patents, PLL

(57) ABSTRACT

A system and method for facilitating patent grant and patent application claims examination; including the functions of automated importing of patent claims, automated parsing of the claims into their hierarchy, and compression/expansion of the parsed claims to/from the independent claim level.

43 Claims, 9 Drawing Sheets

Figure 6

- 6500481
  - The invention provides biomedical devices. In particular, the invention provides biomedical devices on the surfaces of which stable, hydrophilic, amide-containing coatings are formed.
  - 1. A method for manufacturing biomedical devices comprising the step of contacting at least one surface of a biomedical device, the surface comprising an effective amount of carboxyl groups, with a coating-effective amount of an amine and a coupling effective amount of at least one coupling agent at a temperature of about 0 to about 95.degree. C. and for a time of about 1 to about 360 minutes to produce a stable, amide-containing coating on the surface.
  - 10. A method for manufacturing biomedical devices comprising the steps of: a.) coating at least one surface of a device with one or more carboxyl functional polymers; and b.) contacting the at least one surface with a coating-effective amount of an amine and a coupling effective amount of at least one coupling agent at a temperature of about 0 to about 95.degree. C. and for a time of about 1 to about 360 minutes to produce a stable, amide-containing coating on the surface.
  - 29. A contact lens comprising at least one surface having an amide-containing coating coupled thereto by at least one coupling agent.

PATENT CLAIMS ANALYSIS SYSTEM AND METHOD

CROSS-REFERENCE TO RELATED APPLICATIONS

This application claims the priority filing benefit of U.S. provisional Patent No. 60/518,119 filed 7 Nov. 2003.

BACKGROUND OF THE INVENTION (1) Field of the Invention

The present invention relates generally to automated work systems and, more particularly, to an automated work system for examining patent grant and patent application claims.

(2) Description of the Prior Art

The number of patent applications is increasing yearly. From 1963 through 1983, approximately 100,000 patent applications per year were filed at the United States Patent & Trademark Office (USPTO), whereas in 2001 alone, 326,508 patent applications were filed. Technology innovation, which needs patent protection to attract capital for development and commercialization, is driving this trend. Interestingly, technology is also facilitating the trend—word processing, remote electronic database searching, and similar technologies are facilitating the patent application process, both for high-technology and low-technology inventions. This large increase in patent applications, and patents in general, means that the ability to understand and communicate one's patent property and competitive position with respect to a large field of other patent property is a difficult task, and is only becoming more difficult with time.

In addition to the growth in patent applications, the number of claims filed with each application is increasing. Patent applications with several hundred claims are now routine. Some patent applications with claims in the 1000's also exist. A patent with 7976 claims is the inventors' current identified maximum. This trend is at least in part due to the patent legal precedent now governing claims interpretation deriving from the case of Festo Corporation v. Shoketsu Kinzoku Kogyo Kabushiki Co. Ltd. In this case, the courts interpreted that narrowing amendments to claims elements made to overcome the patent examiner's objections during prosecution of a patent application can significantly limit patent claims scope by eliminating the doctrine of equivalents and invoking prosecution history estoppel for the amended claims element.

Thus, a need exists for an automated method and system to reduce the amount of information users need to review in order to make a judgment relating to the claims of a patent or patent application.

SUMMARY OF THE INVENTION

The present invention provides a system, method, and/or a graphical user interface for displaying patent claims, the system including: at least one input device in communication with a computer and at least one output device, wherein at least one user is capable of inputting information via the at least one input device to the at least one computer and viewing information on the at least one output device, and wherein the at least one computer is capable of storing, modifying, outputting, and retrieving information in communication with the at least one input device and at least one output device; and software installed and capable of running on the at least one computer for automatically importing patent claims based upon the user inputted information, parsing the patent claims hierarchically, generating a hierarchical claims diagram, and outputting a viewable diagram of the parsed claims; wherein the claims diagram shows at least part of a patent claims series in an interactive format that permits expansion and compression of the at least part of a patent claims series according to the hierarch of the at least part of a patent claims series.

These and other aspects of the present invention will become apparent to those skilled in the art after a reading of the following description of the preferred embodiment when considered with the drawings.

BRIEF DESCRIPTION OF THE DRAWINGS

FIG. 6 is a screen view of an automated system according to the present invention.

DETAILED DESCRIPTION OF THE PREFERRED EMBODIMENTS

Figure 1:
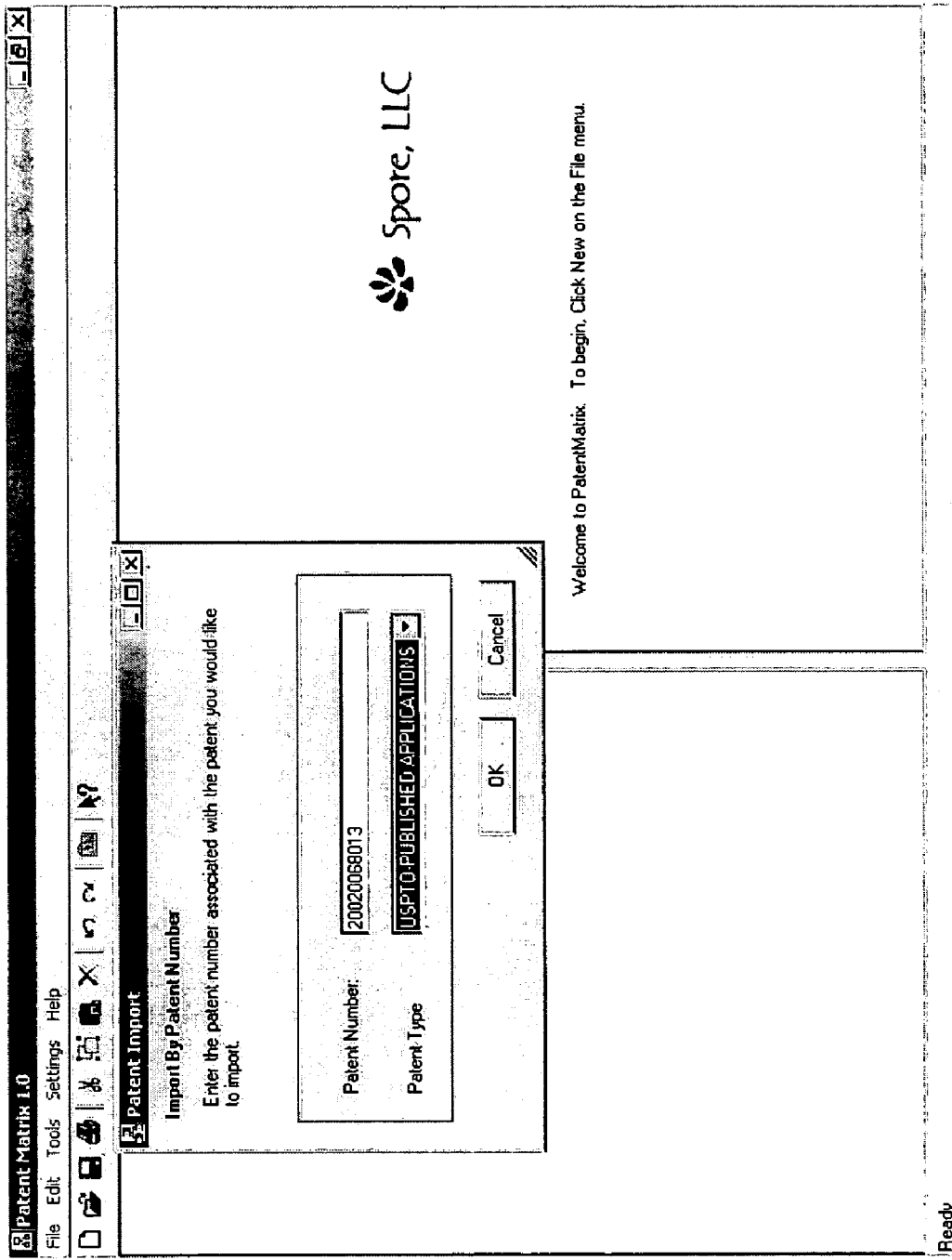
FIG. 1 is a screen view of an automated system according to the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms. Referring now to the drawings in general, the illustrations are for the purpose of describing a preferred embodiment of the invention and are not intended to limit the invention thereto.

The Patent Matrix system was developed as a methodology and then as a software tool to facilitate patent examination and patent application drafting. The software tool is stored in a computer readable medium which can include but is not limited to memory such as RAM or ROM, hard disks, optical disks, and any other well-known storage medium. The users of the software include patent portfolio managers, inventors, technology assessors, patent attorneys and agents, and patent examiners. A primary goal of the software is to reduce the amount of information users need to review in order to make a judgment relating to the claims of a patent or patent application.

Importing patent or publication claims directly from United States Patent Office website—Although all sections of a patent include important information, the business and legal value of a patent resides in the claims. With an annual patent application growth rate of approximately 11% and number of claims per patent routinely in the 100's and occasionally in the 1000's, the ability to rapidly and consistently review claims is essential in order to keep pace with the growing patent prior art.

To assist in rapid review of claims, Spore has developed the Patent Matrix software to perform these essential functions:

automated import of patent claims, automated parsing of the claims into their hierarchy, and compression/expansion functionality of the parsed claims to/from the independent claim level.

The software and system used to generate the claims diagrams, also referred to as Patent Matrix diagrams are operable to automatically and substantially instantly import issued or granted patents and patent application publications (grants/applications) directly from US Patent Office website or other database housing documents or patents, by simply selecting "File, Import", typing in the grant/application number, and selecting the appropriate database. In the example shown in FIG. 1, a graphic user interface on a computer screen is shown with interactive elements permits a user to enter a document identifier, in this example, the document identifier is a number: U.S. patent application Ser. No. 20020068013 is being imported from a predetermined database of documents or data, in this example, the US published patent applications database.

Claims Display—A method of the present invention includes the steps of: a user entering/inputting a unique grant/application identifier into the software via a graphical user interface (GUI) or prompt; the software identifying the grant/publication from a database using the unique identifier; importing/selecting the grant/application from the database; parsing the claims to separate each claim as an element of a Patent Matrix diagram; arranging the claims in a hierarchy according to the claims numbering and relationship to other claims; compressing the claims in the hierarchy to display at least only the independent claims to the user via the GUI; the user selectively expanding the compressed claims and compressing the expanded claims as desired.

Figure 2:
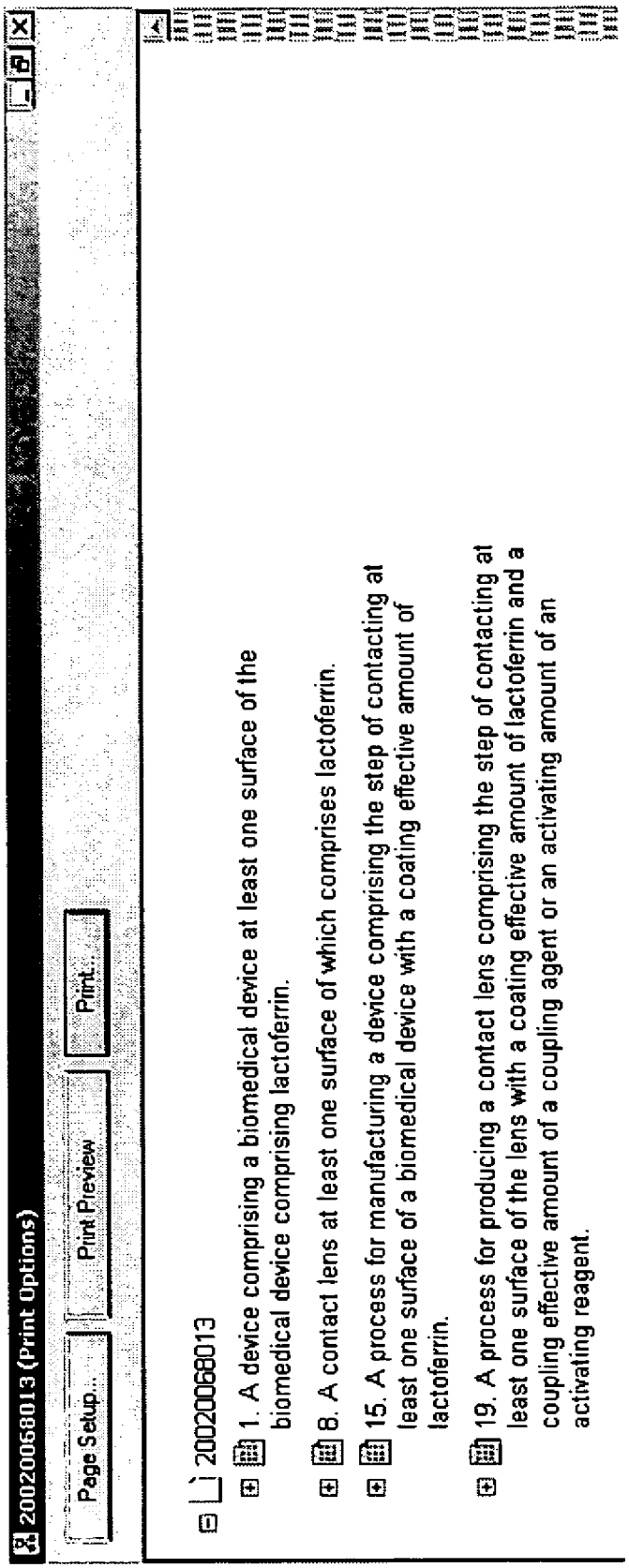
FIG. 2 is a screen view of an automated system according to the present invention.

The document, grant, and/or application is imported, parsed into its hierarchical order, and compressed to the highest level for initial display on an interactive graphical user interface of a computer screen or electronic display, as shown in FIG. 2. The independent claims alone are displayed initially, claims 1, 8, 15, and 19; a plus sign indicator to the left of the independent claim number indicates whether or not sub-elements (parsed elements of the independent claim) and/or dependent claims are available to be shown in an expanded, or uncompressed view. Alternative indicators may be used, such as a number following the claim text indicating the number of compressed elements connected to that independent or higher level element. Note also that sub-elements may also have compressed elements associated with them, even though the sub-elements are not themselves independent claims or the highest level in a hierarchical relationship.

The diagrammatic user interactive compression of claims is particularly useful for persons examining large numbers of grants/applications. The user can quickly look at the independent claims to ascertain if the claims are relevant to the technology being examined. Dependent claims normally only further delimit independent claims. Therefore, usually if an invention falls outside of the scope of an independent claim, there is no need to further examine the dependent claims. For grants/applications where the claims are close to describing the examined invention, these claims should be examined in details.

Figure 3:
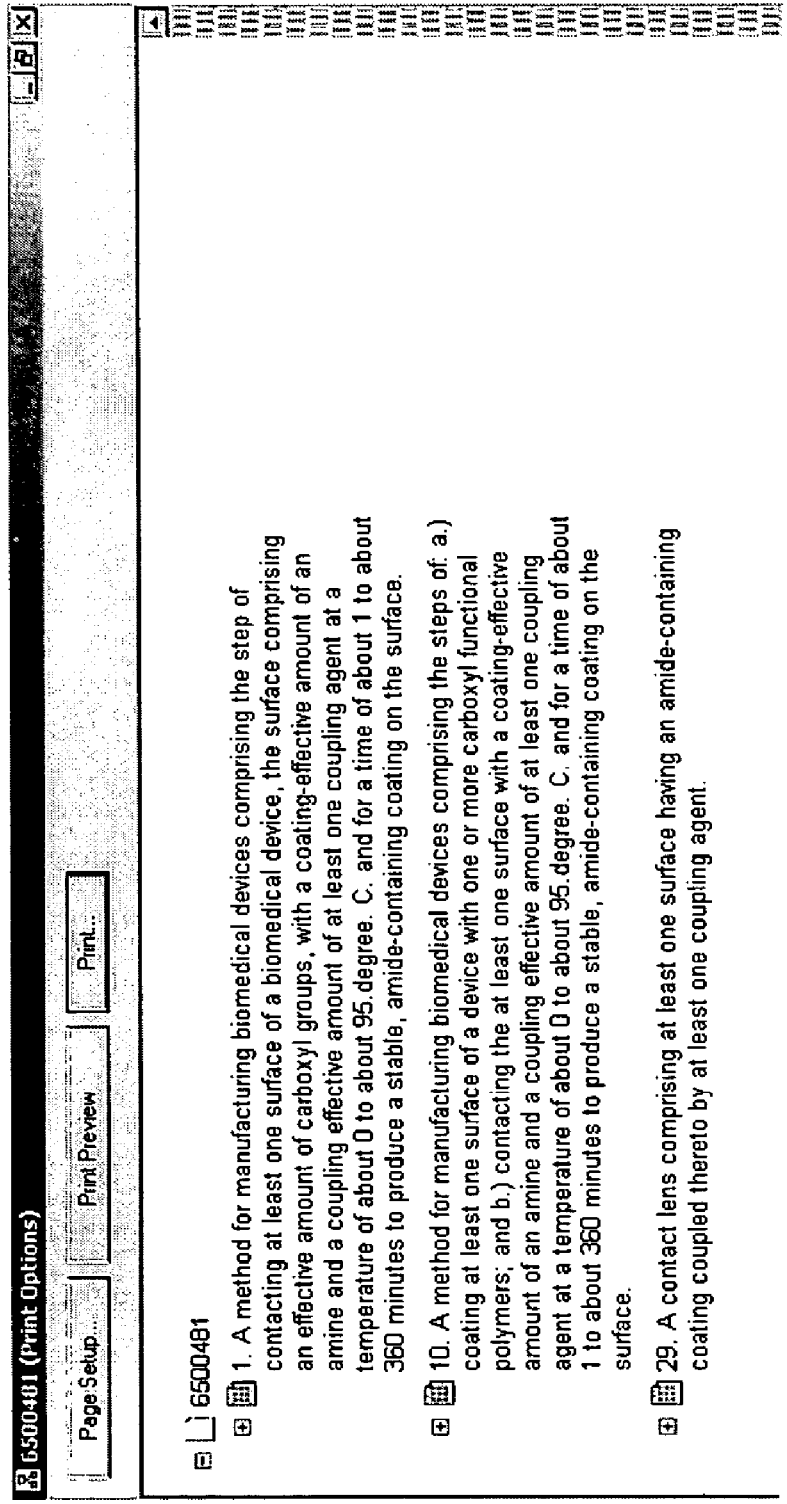
FIG. 3 is a screen view of an automated system according to the present invention.

The independent claims can also be compared to other grants/applications by opening two or more grants/applications in the Patent Matrix. Shown in FIG. 3 is an issued U.S. Pat. No. 6,500,481 related to the technology of the preceding application. Once again, compressed claims are shown in the diagram: claims 1, 10, and 20 are the independent claims series for this patent. The plus sign to the left of each of these claims numbers indicates that some sub-element or dependent claim exists under each compressed claim in the diagram. Note how much easier it is to compare these two inventions when only the independent claims are visible. Compare this method with a claims comparison using the entire grants/applications by retrieving these patents from the USPTO website.

Figure 4:
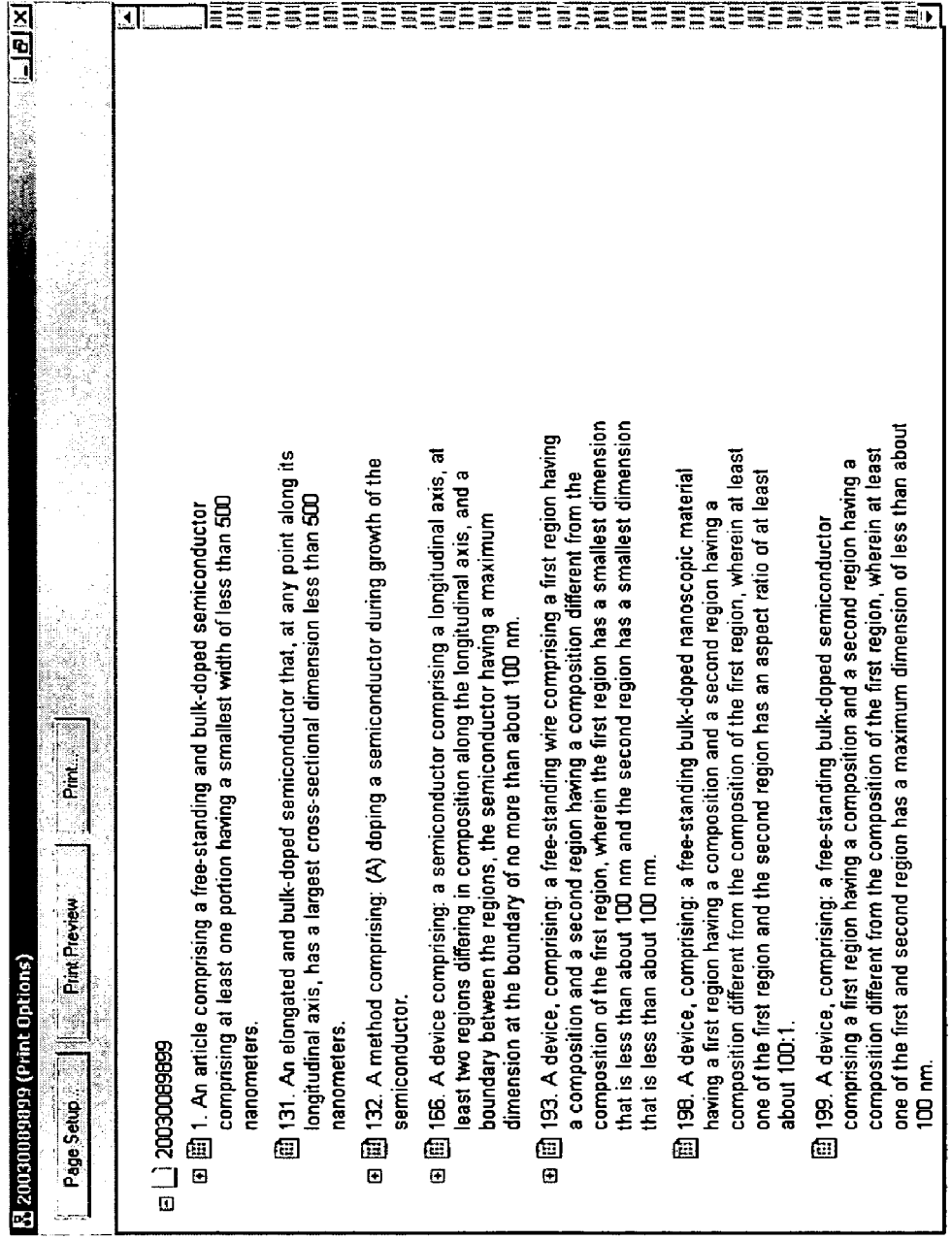
FIG. 4 is a screen view of an automated system according to the present invention.

The utility of the Patent Matrix software increases as the number of claims increases. For example, U.S. patent application Ser. No. 20030089899 was imported using the Patent Matrix software. Shown in FIG. 4 is a screen shot of the first seven (7) independent claims. Note how easy it his to examine the seven independent claims without the intervening 192 dependent claims. This is one of the patent applications with a large number of claims mentioned earlier—709 total claims and 72 independent claims. Additionally, independent series of claims can be group by moving claims series up or down relative to one another.

Figure 5:
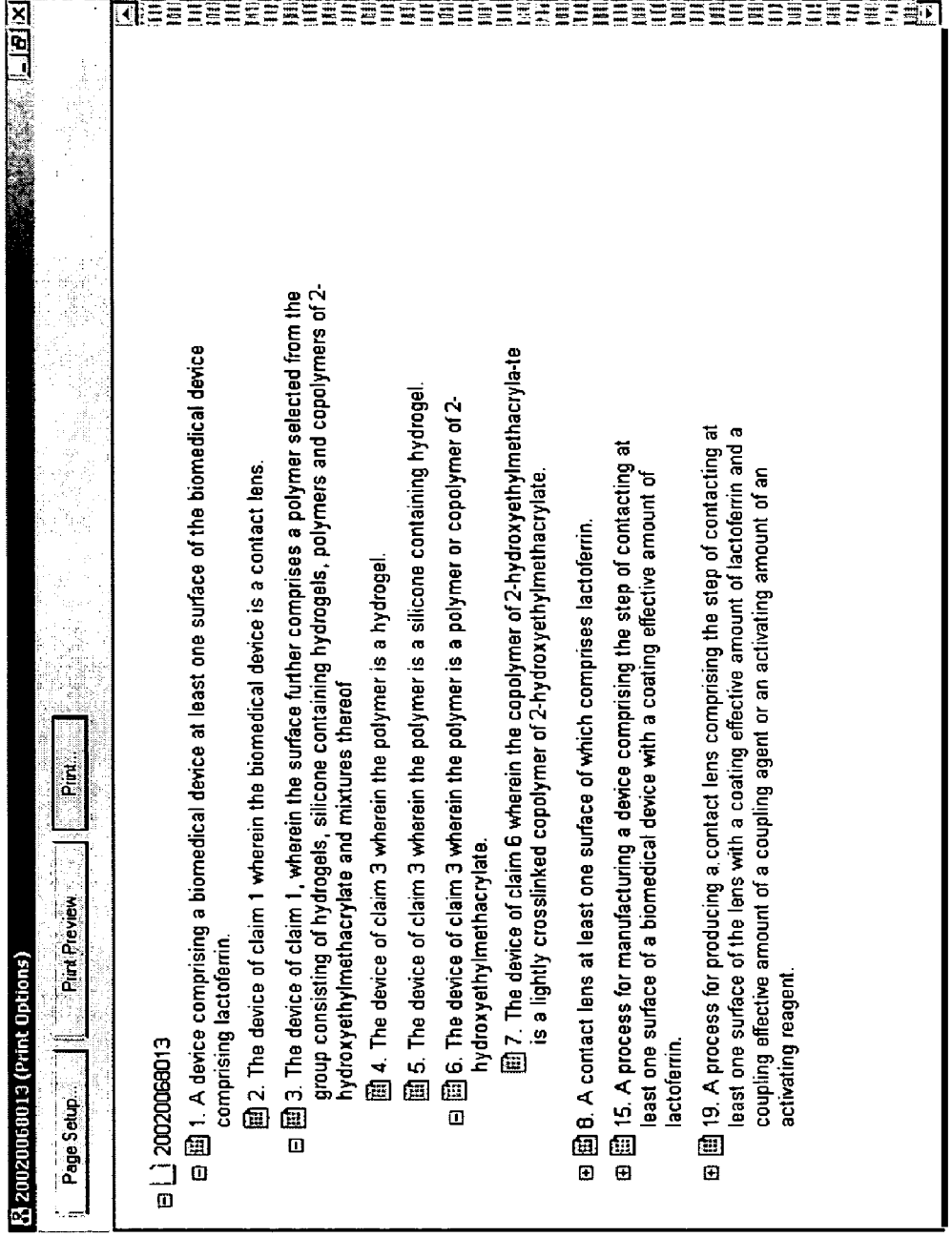
FIG. 5 is a screen view of an automated system according to the present invention.

Expanding the claims to view dependent claims—For grants and/or applications where the independent claims are close to describing the examined invention and may cover the invention, the claims should be examined in detail, including the dependent claims. Independent claim #1 from the U.S. application Ser. No. 20020068013 has been completely expanded, as shown in FIG. 5. Note the hierarchical dependency of dependent claims 2 through 7, automatically created by the Patent Matrix software import function.

Figure 7:
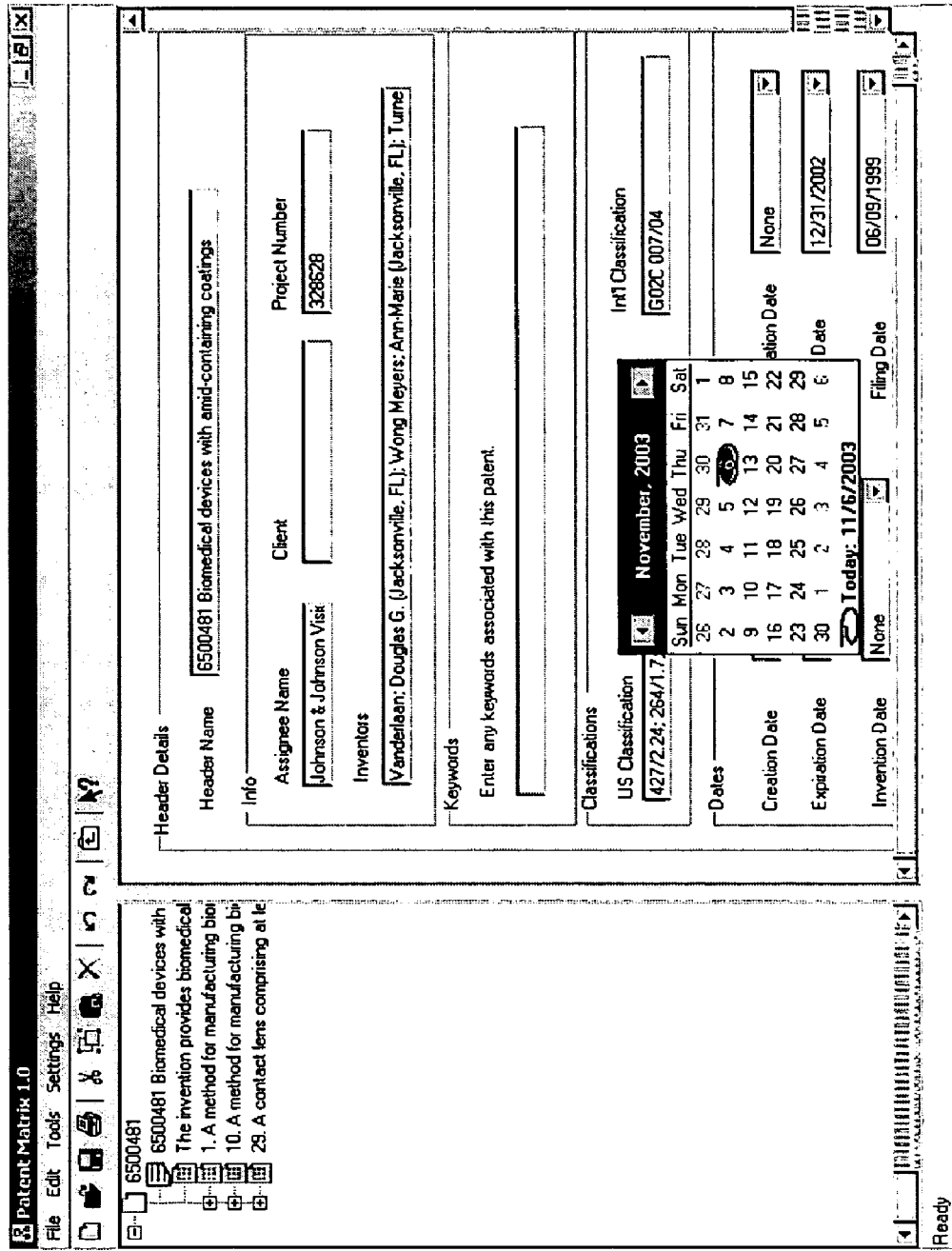
FIG. 7 is a screen view of an automated system according to the present invention.

Other fields—In a preferred embodiment of the present invention, the Patent Matrix software also imports other important fields from a grant/application. In addition to the abstract, as shown in FIG. 6, the filing date, inventors, assignees, etc. are imported into their respective fields in the grant/application header, shown in FIG. 7. The date fields include a pop-up calendar to check or change the date and avoid confusion with International/US date formats. This header information facilitates the use of Patent Matrix files in an invention or disclosure management system.

Figure 8:
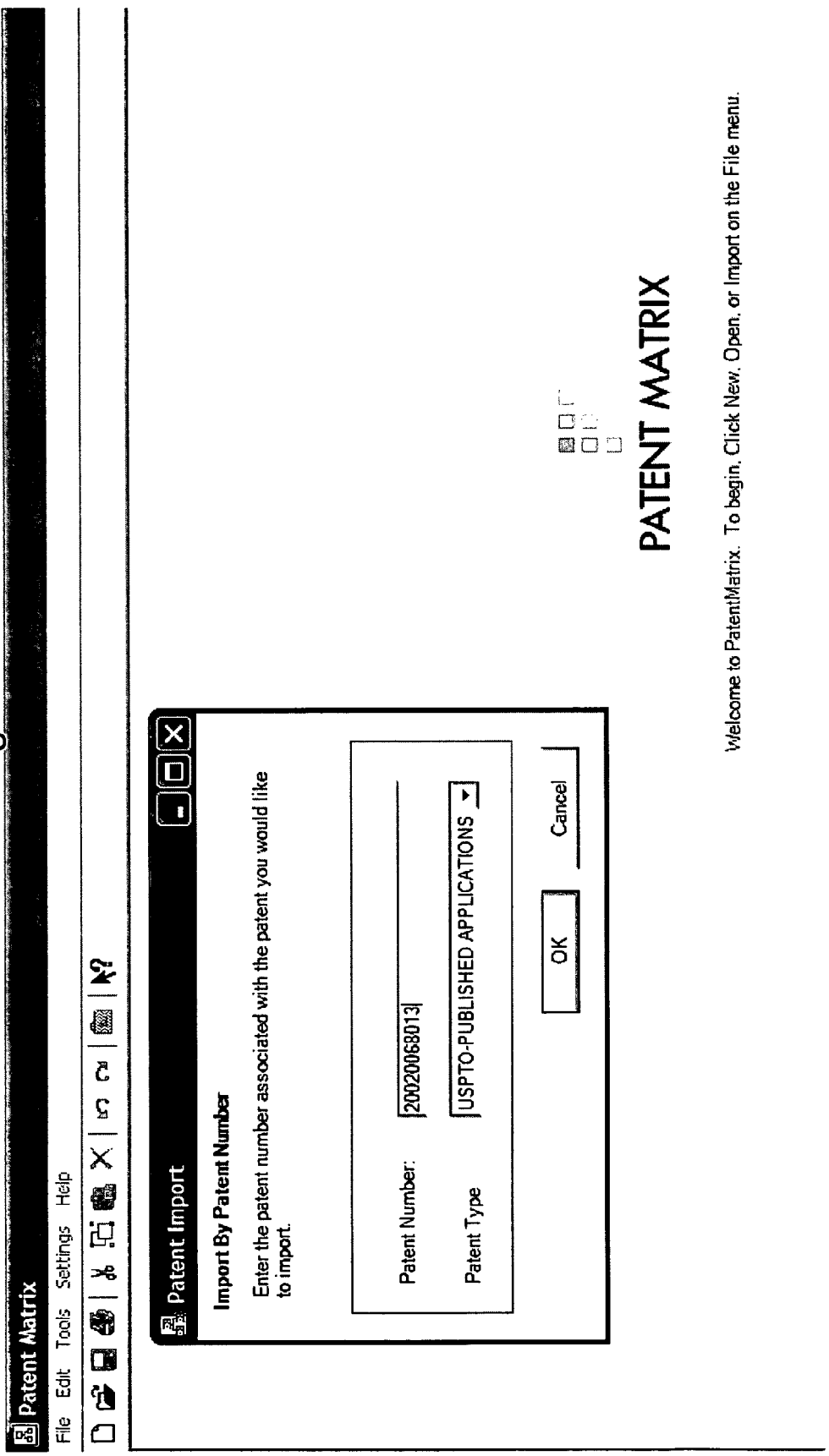
FIG. 8 is another user interface of a compressed claims diagram.
Figure 9:
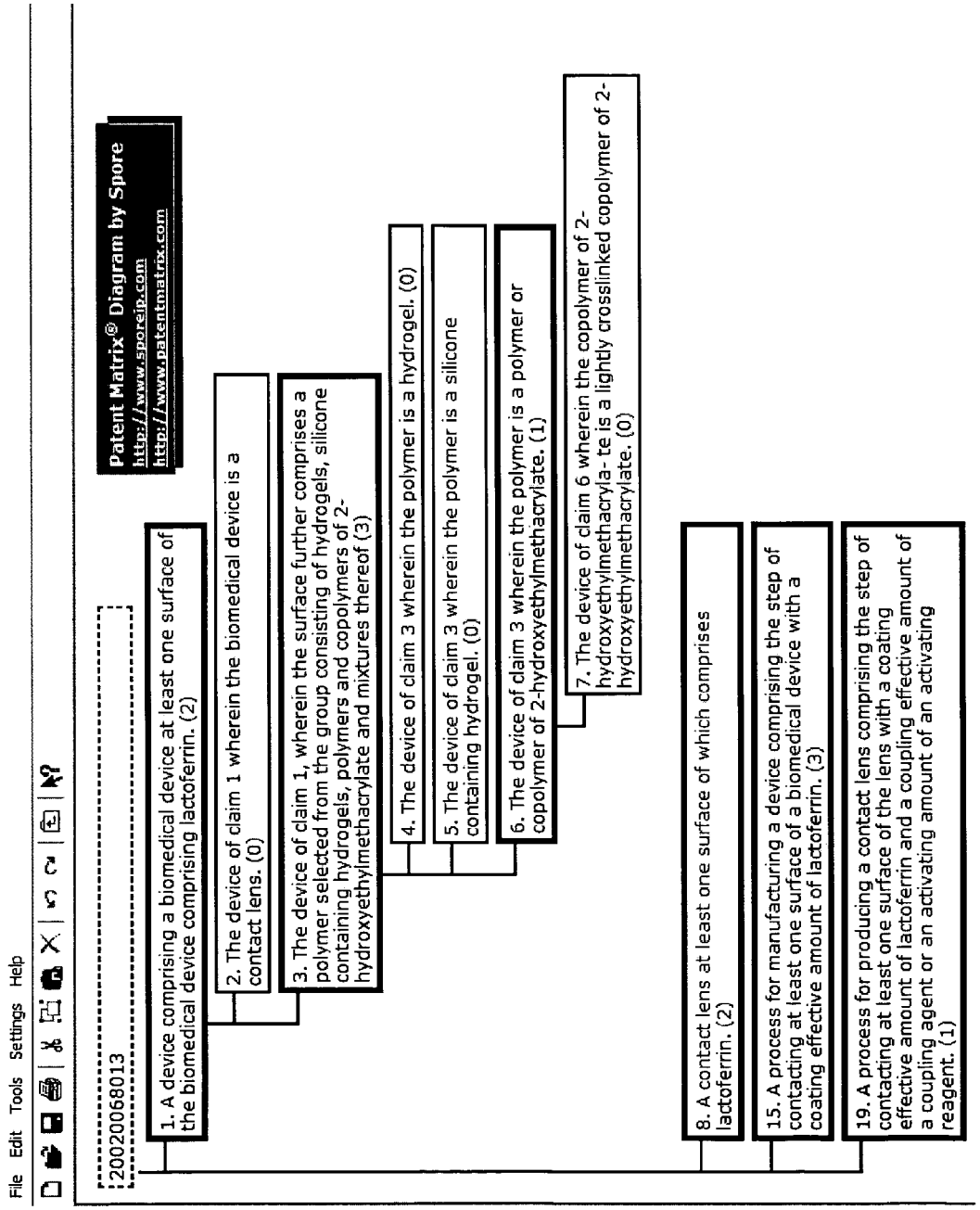
FIG. 9 is another user interface of an expanded view for the claims diagram for the document shown in FIG. 8.

FIG. 8 is another user interface of a compressed claims diagram. In this example, outlining of elements and sub-elements is provided to further enhance user viewing and analysis, as well as interaction with the diagram and its elements. Coloration, as well as shading and/or font changes may be used to further distinguish hierarchical elements and sub-elements. FIG. 9 is another user interface of an expanded view for the claims diagram for the document shown in FIG. 8.

Thus, the present invention provides a system for displaying patent claims, the system including: at least one input device in communication with a computer and at least one output device, wherein at least one user is capable of inputting information via the at least one input device to the at least one computer and viewing information on the at least one output device, and wherein the at least one computer is capable of storing, modifying, outputting, and retrieving information in communication with the at least one input device and at least one output device; and software installed and capable of running on the at least one computer for automatically importing patent claims based upon the user inputted information, parsing the patent claims hierarchically, generating a hierarchical claims diagram, and outputting a viewable diagram of the parsed claims; wherein the claims diagram shows at least part of a patent claims series in an interactive format that permits expansion and compression of the at least part of a patent claims series according to the hierarch of the at least part of a patent claims series.

Furthermore, the present invention system provides for at least part of a claim series to include an independent claim, sub-element(s) of the independent claim, at least one dependent claim, sub-element(s) of the dependent claim(s), and combinations thereof. The system, GUI, and methods are operable to permit the claims to be displayed in compressed or expanded views or states. The interactive GUI permits the user to click select which of the independent claim, at least one dependent claim, sub-element(s) of the dependent claim(s), and combinations thereof to compress or expand, and the reverse, with the default state showing the compressed view initially in a preferred embodiment of the present invention.

The imported claims include an entire claims series, an entire patent's claims, multiple patents' claims, and/or at least part of a patent claims series from more than one patent. Further subcomponent parsing is optionally provided for the user.

In the system, the computer is a single computer, a server, or a computer network. The at least one input device communicates with the computer directly, remotely, wirelessly, via the Internet, and combinations, depending upon the system. The at least one output devices is an electronic output device with graphic user interface.

The present invention further provides for a method for displaying patent claims, the method steps comprising:

a. providing a system as in the foregoing;
b. selecting at least part of a patent claims series;
c. importing the at least part of a patent claims series into the data processor running the software;
d. parsing the at least part of a a patent claims series into the claims hierarchy of at least part of a patent claims series;
e. displaying the parsed at least part of a a patent claims series in an interactive format that permits expansion and compression of the at least part of a patent claims series according to the hierarch of the at least part of a patent claims series.

As in the foregoing system, the method provides for steps operable to provide for at least part of a claim series to include an independent claim, sub-element(s) of the independent claim, at least one dependent claim, sub-element(s) of the dependent claim(s), and combinations thereof. The system, GUI, and methods are operable to permit the claims to be displayed in compressed or expanded views or states. The interactive GUI permits the user to click select which of the independent claim, at least one dependent claim, sub-element(s) of the dependent claim(s), and combinations thereof to compress or expand, and the reverse, with the default state showing the compressed view initially in a preferred embodiment of the present invention.

The present invention further provides for an interactive user interface for providing a diagram of patent claims, the diagram including:

an interactive graphical user interface (GUI) viewable on an electronic display, the GUI including a diagram of at least part of a patent claims series;
wherein the claims are parsed hierarchically
and the claims are compressible hierarchically.

Furthermore, the GUI of the present invention system provides for at least part of a claim series to include an independent claim, sub-element(s) of the independent claim, at least one dependent claim, sub-element(s) of the dependent claim(s), and combinations thereof. The system, GUI, and methods are operable to permit the claims to be displayed in compressed or expanded views or states. The interactive GUI permits the user to click select which of the independent claim, at least one dependent claim, sub-element(s) of the dependent claim(s), and combinations thereof to compress or expand, and the reverse, with the default state showing the compressed view initially in a preferred embodiment of the present invention.

Certain modifications and improvements will occur to those skilled in the art upon a reading of the foregoing description. By way of example, the diagrams are preferably operable to provide for user annotation. Also, it is preferred that the diagrams are representable in a multiplicity of formats, depending upon user preference, such as .html. Also, electronic representations of the diagrams are electronically linked to the underlying documents from which the claims were identified and/or parsed, for providing quick comparison between them. All modifications and improvements have been deleted herein for the sake of conciseness and readability but are properly within the scope of the following claims.

What is claimed is:

1. A system for displaying patent claims, the system comprising:

at least one input device in communication with a computer and at least one output device, wherein at least one user is capable of inputting information via the at least one input device to the at least one computer and viewing information on the at least one output device, and wherein the at least one computer is capable of storing, modifying, outputting, and retrieving information in communication with the at least one input device and at least one output device;

and software installed and capable of running on the at least one computer for automatically importing patent claims based upon the user inputted information, parsing the patent claims hierarchically, generating a hierarchical claims diagram comprising graphical claim structure and textual claim content associated with each patent claim, the textual content of each claim ending with a numerical representation of how many claims directly depend on that claim, and outputting a viewable diagram of the parsed claims wherein, for each patent claim, the graphical claim structure fully includes the textual claim content;

wherein the claims diagram shows at least part of a patent claims series in an interactive format that is operable to dynamically expand and compress the at least part of a patent claims series, including both the graphical claim structure and the fully included textual claim content, according to the hierarchy of the at least part of a patent claims series;

wherein the graphical claim structure comprises multiple geometric outlines, each outline operable to fully contain the textual claim content of one claim, and at least one line directly connecting the outlines to each other according to the hierarchy of the at least part of a patent claims series;

wherein at least one of the multiple geometric outlines further has a visual emphasis, the visual emphasis indicating whether there are additional levels of the hierarchy of the at least part of a patent claims series directly connected to the at least one of the multiple geometric outlines that has a visual emphasis.

2. The system of claim 1, wherein the at least part of a claim series include an independent claim.

3. The system of claim 1, wherein the claim series includes at least one dependent claim that depends from the independent claim.

4. The system of claim 1, wherein the claims are displayed in a compressed state.

5. The system of claim 1, wherein the claims are displayed in an expanded state.

6. The system of claim 1, wherein the imported claims are an entire claims series.

7. The system of claim 1, wherein the imported claims are an entire patent's claims.

8. The system of claim 1, wherein the imported claims are at least part of a patent claims series from more than one patent.

9. The system of claim 1, wherein the parsing includes subcomponent parsing.

10. The system of claim 1, wherein the claims are displayed in html.

11. The system of claim 10, wherein the claims are displayed in a compressed state.

12. The system of claim 10, wherein the claims are displayed in an expanded state.

13. The system of claim 1, wherein the computer is a server.

14. The system of claim 1, wherein the computer is a member of a computer network.

15. The system of claim 1, wherein the at least one input device communicates with the computer directly.

16. The system of claim 1, wherein the at least one input device communicates with the computer remotely.

17. The system of claim 1, wherein the at least one input device communicates with the computer wirelessly.

18. The system of claim 1, wherein the at least one input device communicates with the computer via the Internet.

19. The system of claim 1, wherein the at least one output devices is an electronic output device with graphic user interface.

20. A method for displaying patent claims, the method steps comprising:
 selecting at least part of a patent claims series;
 importing the at least part of a patent claims series;
 parsing the at least part of a patent claims series into the claims hierarchy of at least part of a patent claims series;
 displaying the parsed at least part of a patent claims series in an interactive format that is operable to dynamically expand and compress the at least part of a patent claims series, including both the graphical claim structure and the fully included textual claim content, according to the hierarch of the at least part of a patent claims series, the textual content of each claim ending with a numerical representation of how many claims directly depend on that claim;
 wherein the graphical claim structure comprises multiple geometric outlines, each outline operable to fully contain the textual claim content of one claim and at least one line directly connecting the outlines to each other according the hierarch of the at least part of a patent claims series;
 wherein at least one of the multiple geometric outlines further has a visual emphasis, the visual emphasis indicating whether there are additional levels of the hierarchy of the at least part of a patent claims series directly connected to the at least one of the multiple geometric outlines that has a visual emphasis.

21. The method of claim 20, wherein the at least part of a claim series include an independent claim.

22. The method of claim 20, wherein the at least part of a claim series includes at least one dependent claim that depends from the independent claim.

23. The method of claim 20, further including displaying the claims in a compressed state.

24. The method of claim 20, further including displaying the claims in an expanded state.

25. The method of claim 20, wherein the imported claims are an entire claims series.

26. The method of claim 20, wherein the imported claims are an entire patent's claims.

27. The method of claim 20, wherein the imported claims are at least part of a patent claims series from mare than one patent.

28. The method of claim 20, wherein the parsing includes subcomponent parsing.

29. The method of claim 20, further including displaying the claims in html.

30. The method of claim 29, further including displaying the claims in a compressed state.

31. The method of claim 29, further including displaying the claims in an expanded state.

32. A computer readable medium having instructions for causing a computer to create an interactive graphic user interface (GUI) for providing a diagram of patent claims, the diagram comprising:
 an interactive graphical user interface (GUI) viewable on an electronic display, the GUI including a diagram of at least part of a patent claims series;
 wherein the claims are parsed hierarchically wherein the diagram comprises graphical claim structure and textual claim content associated with each patent claim and wherein, for each patent claim, the graphical claim structure fully includes the textual claim content, the textual content of each claim ending with a numerical representation of how many claims directly depend on that claim;
 and the claims, including both the graphical claim structure and the fully included textual claim content, are dynamically compressible hierarchically; wherein the graphical claim structure comprises multiple geometric outlines, each outline operable to fully contain the textual claim content of one claim, and at least one line directly connecting the outlines to each other according the hierarch of the at least part of a patent claims series;
 wherein at least one of the multiple geometric outlines further has a visual emphasis, the visual emphasis indicating whether there are additional levels of the hierarchy of the at least part of a patent claims series directly connected to the at least one of the multiple geometric outlines that has a visual emphasis.

33. The computer readable medium having instructions for causing a computer to create an interactive GUI of claim 32, wherein the at least part of a claim series include an independent claim.

34. The computer readable medium having instructions for causing a computer to create an interactive GUI of claim 32, wherein the claim series includes at least one dependent claim that depends from the independent claim.

35. The computer readable medium having instructions for causing a computer to create an interactive GUI of claim 32, wherein the claims are displayed in a compressed state.

36. The computer readable medium having instructions for causing a computer to create an interactive GUI of claim 32, wherein the claims are displayed in an expanded state.

37. The computer readable medium having instructions for causing a computer to create an interactive GUI of claim 32, wherein the imported claims are an entire claims series.

38. The computer readable medium having instructions for causing a computer to create an interactive GUI of claim 32, wherein the imported claims are an entire patent's claims.

39. The computer readable medium having instructions for causing a computer to create an interactive GUI of claim 32, wherein the imported claims are at least part of a patent claims series from more than one patent.

40. The computer readable medium having instructions for causing a computer to create an interactive GUI of claim 32, wherein the parsing includes subcomponent parsing.

41. The computer readable medium having instructions for causing a computer to create an interactive GUI of claim 32, wherein the claims are displayed in html.

42. The computer readable medium having instructions for causing a computer to create an interactive GUI of claim 41, wherein the claims are displayed in a compressed state.

43. The computer readable medium having instructions for causing a computer to create an interactive GUI of claim 41, wherein the claims are displayed in an expanded state.

* * * * *